United States Patent
Zhu et al.

(10) Patent No.: US 8,515,146 B2
(45) Date of Patent: Aug. 20, 2013

(54) DEFORMABLE MOTION CORRECTION FOR STENT VISIBILITY ENHANCEMENT

(75) Inventors: Ying Zhu, Monmouth Junction, NJ (US); Christophe Chefd'hotel, Jersey City, NJ (US)

(73) Assignee: Siemens Aktiengesellschaft, Munich (DE)

(*) Notice: Subject to any disclaimer, the term of this patent is extended or adjusted under 35 U.S.C. 154(b) by 146 days.

(21) Appl. No.: 13/277,312

(22) Filed: Oct. 20, 2011

(65) Prior Publication Data

US 2012/0140998 A1    Jun. 7, 2012

Related U.S. Application Data (60) Provisional application No. 61/406,654, filed on Oct. 26, 2010.

(51) Int. Cl.
  *G06K 9/00*    (2006.01)
  *A61B 1/00*    (2006.01)

(52) U.S. Cl.
  USPC .......................... 382/128; 600/138; 623/1.11

(58) Field of Classification Search
  USPC ............... 382/128, 129, 130, 131, 1, 32, 133, 382/134; 600/138, 139, 374, 508, 576, 581; 607/119, 122; 623/1.11, 1.12, 1.13, 1.14, 623/1.15, 1.16, 1.17, 1.2, 23.7, 900
  See application file for complete search history.

(56) References Cited

U.S. PATENT DOCUMENTS 7,991,453 B2 * 8/2011 Florent et al. ................. 600/425

* cited by examiner

*Primary Examiner* — Abolfazl Tabatabai
(74) *Attorney, Agent, or Firm* — Donald B. Paschburg; F. Chau & Associates, LLC (57) ABSTRACT

A method for enhancing stent visibility includes acquiring a set of image frames including multiple test frames. A set of measurement points uniformly distributed within an image of a stent is defined in the test frames. A local image context is defined around each measurement point. A non-rigid deformation field relating the local image contexts of the test frames to local image contexts of a reference image is calculated. The non-rigid deformation field is optimized by maximizing a similarity function between the local image contexts of the test frames and the local image contexts of the reference image. The optimized non-rigid deformation field is used to deform images of a stent in the multiple test frames and combine the non-rigidly deformed images of the stent from the test frames. An image frame with the combined image of the stents superimposed thereon is displayed.

22 Claims, 7 Drawing Sheets

Fig. 7

DEFORMABLE MOTION CORRECTION FOR STENT VISIBILITY ENHANCEMENT

CROSS-REFERENCE TO RELATED APPLICATION

The present application is based on provisional application Ser. No. 61/406,654, filed Oct. 26, 2010, the entire contents of which are herein incorporated by reference.

BACKGROUND OF THE INVENTION

1. Technical Field

The present disclosure relates to stent visibility enhancement and, more specifically, to a method and system for deformable motion correction for stent visibility enhancement.

2. Discussion of Related Art

Coronary artery stenosis is a form of coronary heart disease in which the passage of blood through a coronary artery becomes at least partially obstructed by the thickening of the coronary artery walls due to the accumulation of fatty materials such as cholesterol. If left untreated, coronary artery stenosis can lead to angina and death.

Figure 1:
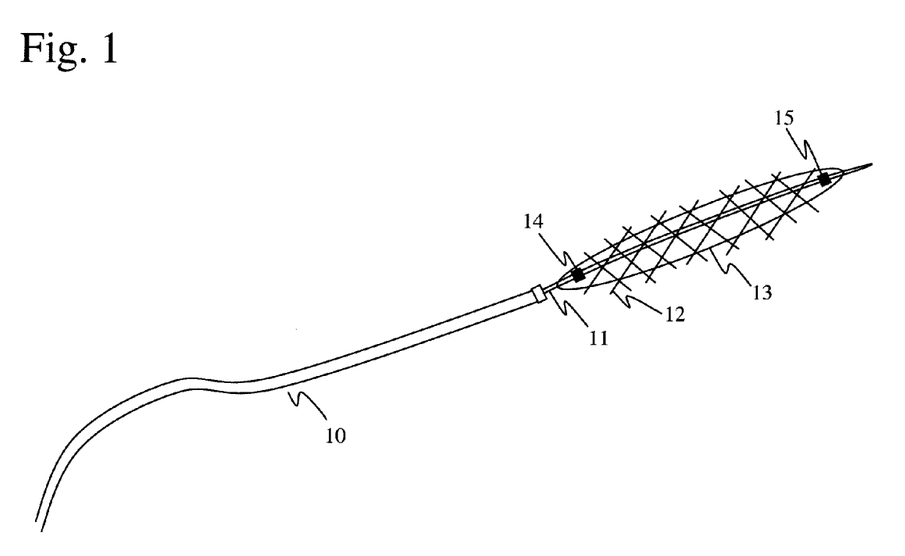
FIG. 1 is a diagram illustrating an example of a coronary stent and delivering devices.

While coronary artery stenosis may be treated with medication, advanced cases may warrant intervention such as angioplasty. Here, a coronary stent may be inserted into the coronary artery. FIG. 1 is a diagram illustrating an example of a coronary stent and delivering devices. The coronary stent includes a catheter 10. A guide wire 11 runs through the catheter 10 and extends beyond an end of the catheter 10. Attached to the guide wire is a balloon 13. The stent 14 is positioned around the balloon 13. Once the stent 14 is in place, the balloon 13 may be inflated to open the stent 14 to the desired size. The stent 14 will then retain its open shape after the balloon 13 has been deflated and removed. The open shape of the stent 14 may then push apart the walls of the coronary artery to allow greater blood flow there through. The stent 14 may also be treated with medication for treating the accumulation of fatty materials that line the coronary artery walls.

Proper placement of the stent requires accurate visualization of the stent as it is moved through the arteries of the patient. Visualization may be obtained using a fluoroscope. However, as a contrast agent is administered into the bloodstream of the patient to visualize the arteries, the presence of the contrast agent within the arteries may obfuscate the stent within the fluoroscopic images thereby complicating proper stent placement.

SUMMARY

A method for enhancing stent visibility in a set of image frames includes acquiring a set of image frames including multiple test frames. A set of measurement points uniformly distributed within an image of a stent is defined in each of the multiple test frames. A local image context is defined around each measurement point of each of the multiple test frames. A non-rigid deformation field that relates the local image contexts of each of the multiple test frames to local image contexts of a reference image is calculated. The non-rigid deformation field is optimized by maximizing a similarity function between the local image contexts of each of the multiple test frames and the local image contexts of the reference image for non-rigid registration. The optimized non-rigid deformation field is used to deform images of a stent in each of the multiple test frames and combine the non-rigidly deformed images of the stent from each of the multiple test frames. An image frame of the set of image frames with the combined image of the stents superimposed thereon is displayed.

Prior to calculating the non-rigid deformation field, the test frame may be preliminarily aligned to a selected reference frame for preliminary alignment based on markers visible within the test frame and the selected reference frame for preliminary alignment. The preliminary alignment may be a rigid or affine alignment. The markers may include balloon markers. Prior to calculating the rigid deformation field, preprocessing may be performed on the set of image frames. Preprocessing may include removing a static background from the set of image frames.

The reference image may be defined as a test frame of the multiple test frames or an average of multiple rigidly aligned test frames of the multiple test frames.

After combining the stent image and prior to displaying the image frame, post processing may be performed on the image frame with the combined image of the stents superimposed thereon. Post processing may include adding back a static background that had been removed from the set of image frames.

The set of image frames may be acquired using a fluoroscope.

The displayed image frame with the combined image of the stents superimposed thereon may be used to aid in assessment of stent deployment to a desired location. The desired location may be a coronary artery stenosis.

The local image contexts of the test frame may be oriented approximately in the direction of stent expansion. The direction of stent expansion may be tangential to the long axis of the stent image.

A method for enhancing stent visibility in a set of image frames includes acquiring a set of image frames including a test frame and a reference frame. Balloon markers are detected within the test frame and the reference frame. A static background is removed from the test frame and the reference frame. Rigid image alignment of the test frame to the reference frame is performed using the detected balloon markers. Non-rigid registration of the test frame to the reference frame or an average of multiple rigidly aligned images is performed based on local image contexts of stent imagery within the test frame and the reference frame. Temporal integration of the stent imagery is performed using the non-rigid registration.

The method may further include displaying the temporal integration. The removed static background may be reintroduced prior to displaying the temporal integration. The local image contexts may be defined uniformly within the stent imagery.

A computer system includes a processor and a non-transitory, tangible, program storage medium, readable by the computer system, embodying a program of instructions executable by the processor to perform method steps for enhancing stent visibility in a set of image frames. The method includes acquiring a set of image frames including a test frame and a reference frame. The test frame and the reference frame are preprocessed. Non-rigid registration of the test frame to the reference frame is performed based on local image contexts of stent imagery within the test frame and the reference frame. Temporal integration of the stent imagery is performed using the non-rigid registration.

Rigid or affine image alignment of the test frame to the reference frame may be performed prior to using the detected balloon markers. The rigid or affine image alignment may be performed based on balloon marker images or guidewire images.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to enhance visualization of a stent within fluoroscopic imagery to facilitate stent placement within the coronary artery. This stent visibility enhancement may be performed by performing temporal integration in which imagery of the stent from within multiple fluoroscopic image frames may be combined to form a more complete image of the stent and this combined image may then be superimposed over a current fluoroscopic view to aid in stent placement.

As the coronary artery changes location and shape with the cardiac cycle, the location and shape of the stent may also change. Accordingly, it may be difficult to accurately perform temporal integration for the stent image within the coronary artery due to the presence of deformable motion.

Exemplary embodiments of the present invention provide approaches for temporal enhancement of stent visibility in fluoroscopic imagery that corrects for deformable motion. By correcting for the deformable motion, temporal integration may be more accurately performed and assessment of proper stent placement may be facilitated. According to exemplary embodiments of the present invention, deformable motion may be corrected for by performing non-rigid registration prior to temporal integration. Non-rigid registration may be used to transform the stent imagery to a common frame of reference and correct for elastic stent deformation so that temporal integration may be accurately performed. As exemplary embodiments of the present invention utilize actual stent imagery in performing non-rigid registration, rather than imagery of the guide wire and/or balloon location markers, accuracy of the temporal integration and image enhancement may be ensured.

Figure 2:
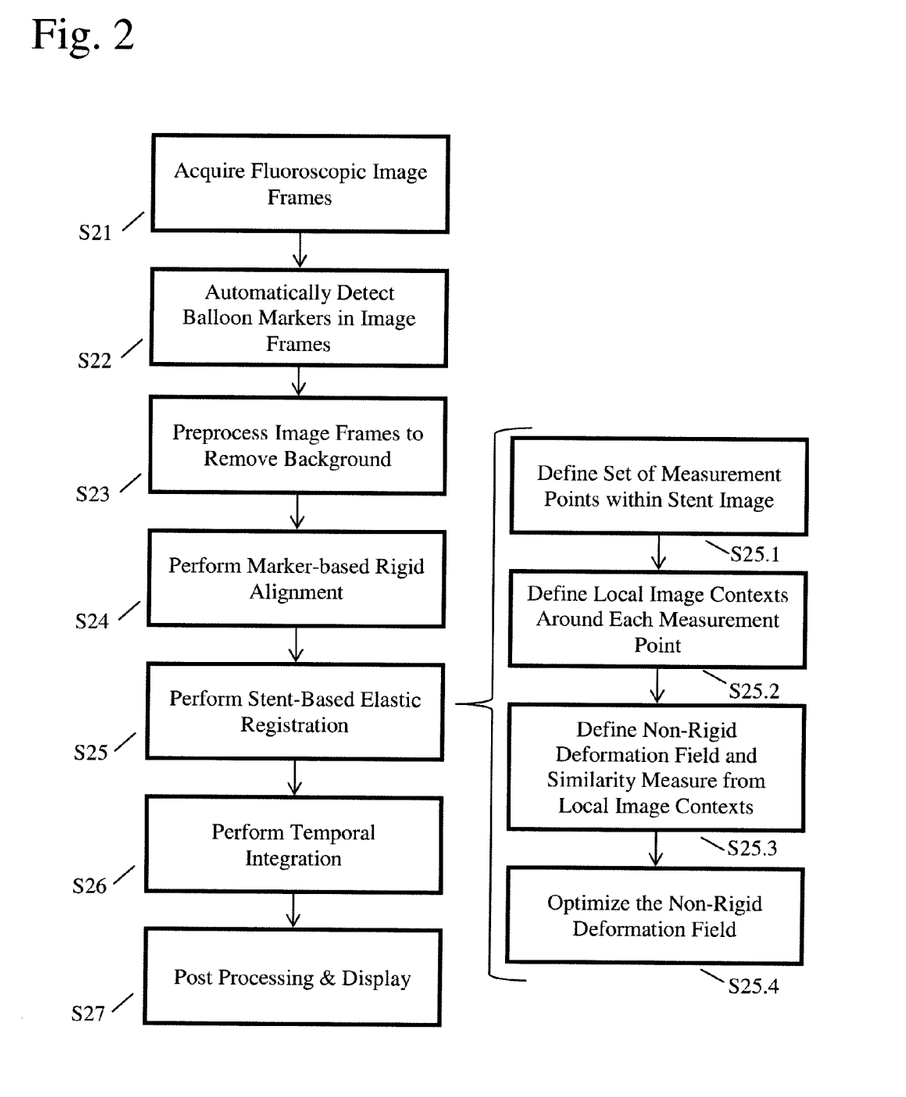
FIG. 2 is a flow chart illustrating a method for enhancing visualization of a stent within fluoroscopic imagery according to exemplary embodiments of the present invention.

FIG. 2 is a flow chart illustrating a method for enhancing visualization of a stent within fluoroscopic imagery according to exemplary embodiments of the present invention. First, a sequence of image frames may be acquired (Step S21). The sequence of image frames may be acquired using a fluoroscope. However, exemplary embodiments of the present invention are not limited to the use of a fluoroscope to acquire the sequence of image frames. For example, the images may be acquired with the use of an ultrasound imager or another suitable imaging device. Moreover, the acquired sequence of image frames need not be limited to a sequence of two-dimensional images. For example, the acquired sequence of image frames may include three-dimensional images such as those acquired using a bi-plane fluoroscope or a computed tomography (CT) scanner.

The balloon markers (14 and 15) may be automatically detected within the image frames (Step S22). It need not be necessary to analyze all image frames, as this procedure may be performed on a subset of image frames. Moreover, the entire image frame need not be analyzed; exemplary embodiments of the present invention may limit automatic detection of the balloon markers to a section of each image frame that includes the image of the stent. Additionally, or alternatively, the location of other markers within or connected with the stent 12, catheter 10, or guidewire 11 may be automatically detected at this step.

A preprocessing step may be performed on some or all of the image frames (Step S23). Preprocessing may include the step of removing a static background from the image. The static background may include segments of the image that do not appear to change shape or location from frame to frame. Removal of the static background may be used to reduce the risk that objects within the static background are perceived to be part of the stent. In addition, due to the 2D nature of x-ray fluoroscopy, the image region of the stent may overlap with the projection of other salient structures such as the diaphragm, the spine, etc. and this overlap may interfere with accurate registration. Accordingly, the removal of these and other salient structures may be removed as part of the static background. The preprocessing step S23 may alternatively be performed prior to the marker detection of step S22.

Figure 3:
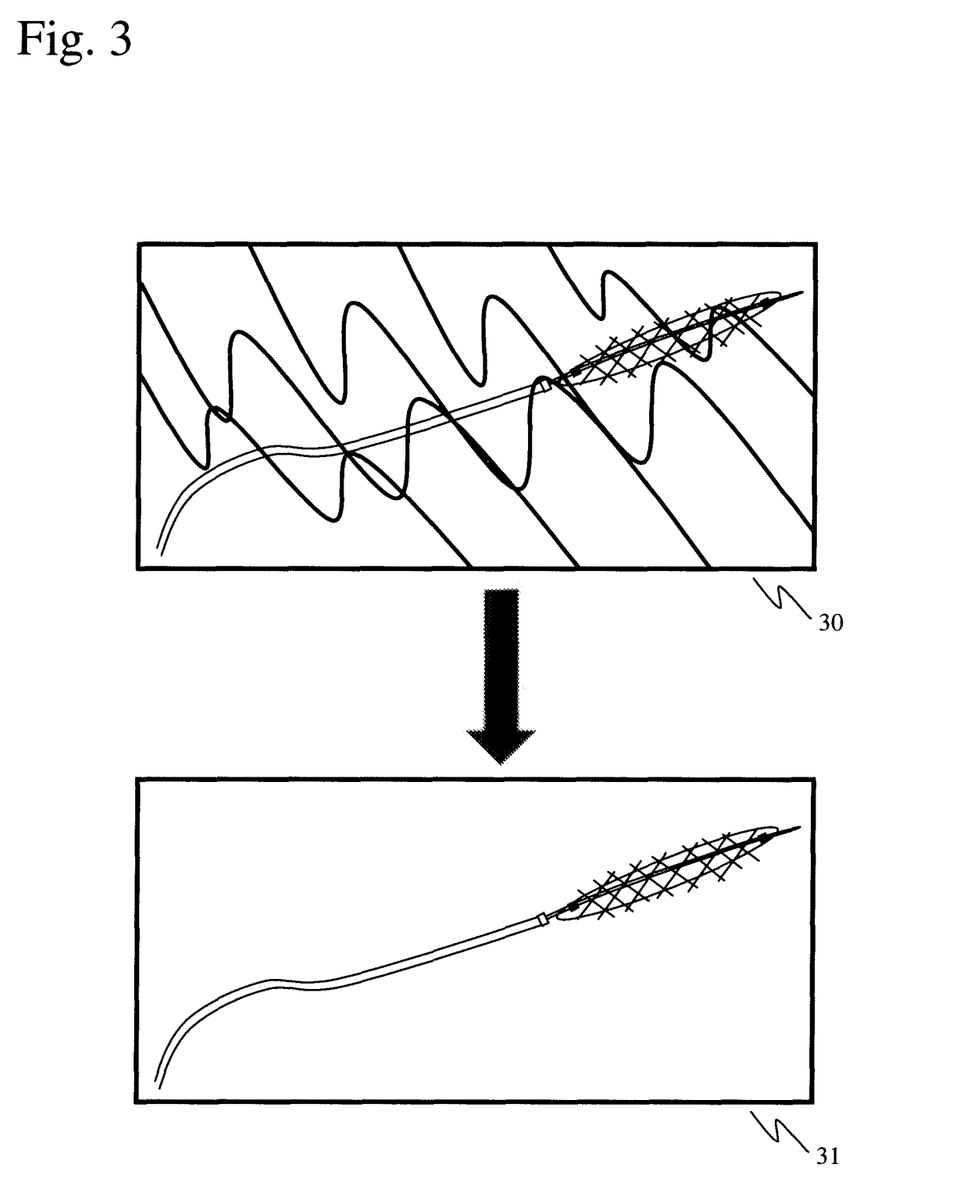
FIG. 3 is a diagram representing the removal of the static background from the image frames.

FIG. 3 is a diagram representing the removal of the static background from the image frames. Image frame 30 represents an image prior to static background removal while image frame 31 represents the same image subsequent to static background removal. The preprocessing step may be an optional step and some exemplary embodiments of the present invention may omit this step. The removed static background information may be retained for subsequent reincorporation.

Next, rigid alignment may be performed in image frames based on the automatically detected location of the balloon markers (14 and 15), and/or any other automatically identified marker (Step S24). Rigid alignment may be used as a first-order approximation of registration, because, as described above, the stent may be subjected to deformation, for example, as a result of cardiac motion. In rigid alignment, a deformation field that translates the markers into a common frame of spatial reference may be determined and then applied to the stent image within the image frames.

Figure 4:
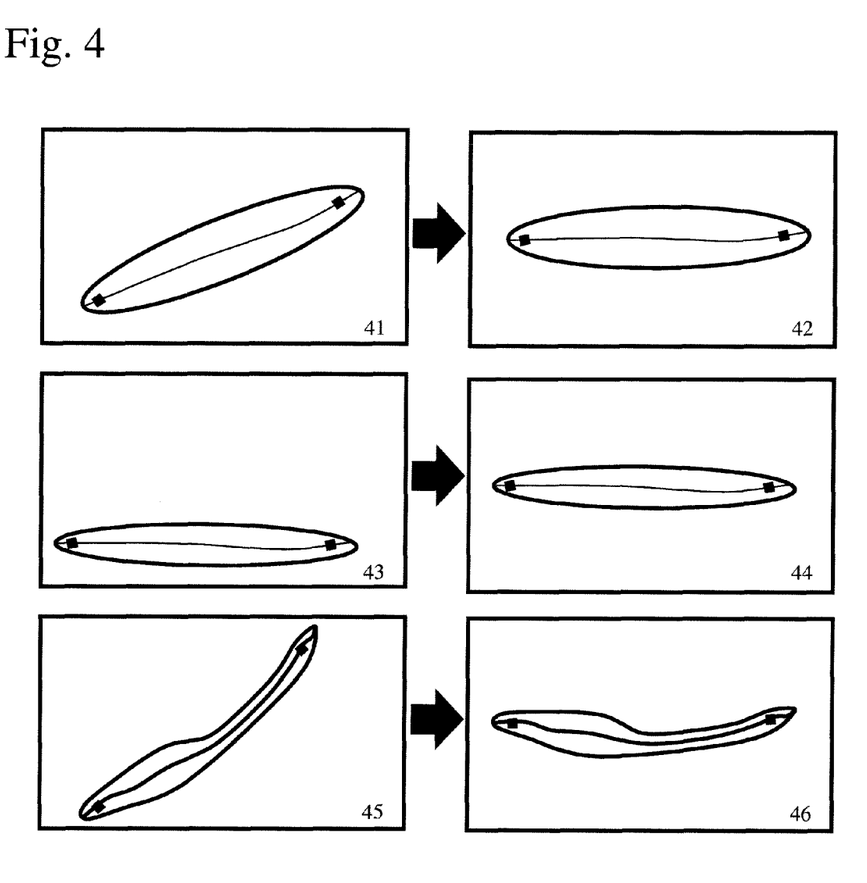
FIG. 4 is a diagram illustrating marker-based rigid alignment according to an exemplary embodiment of the present invention.

FIG. 4 is a diagram illustrating marker-based rigid alignment according to an exemplary embodiment of the present invention. In this example, a first rigid deformation field is applied to image 41 to produce image 42, in which the balloon markers 14 and 15 occupy known locations. The known locations may be that of the balloon markers in a reference frame which may be automatically or manually selected. Similarly, a second rigid deformation field is applied to image 43 to produce image 44, and a third rigid deformation field is applied to image 45 to produce image 45. While the first, second, and third rigid deformation fields may all be different, all image frames may be brought into a common orientation, here, dictated by the position of the balloon markers. However, as described above, rigid registration may also be based on any other readily detectable markers. As may be observed by FIG. 4, the rigid deformation fields applied may impose translation or rotation. Alternatively, the step of rigid alignment may be replaced by a step of affine alignment in which the deformation fields used may be affine and may impose dilation and sheer in addition to rotation and translation. While the rigid alignment step may relieve computational cost from the following step of elastic registration, it should be understood that the step of rigid alignment may be an optional step and may be omitted.

Stent-based elastic registration may then be performed (Step S25). This step may be performed to correct for stent deformation that may result from cardiac motion and may not have been corrected in the prior step of marker-based rigid alignment. Stent-based elastic registration may be performed directly on the imagery of the stents, as observed from the background removed images. Thus, stent-based elastic registration may seek to directly align the imagery of the stents. In this regard, the location of the balloon markers and/or shape of the guidewire need not be the focus of alignment in performing the elastic registration as it is the actual stent imagery that is aligned. Registration may be performed by aligning the guidewire through the elastic registration and then using the resulting deformation field determined by the wire alignment to align the stent images (wire-based alignment), exemplary embodiments of the present invention appreciate that the relative shape and location of the stent as compared to the guidewire may change (i.e. wire motion may be different from stent motion). Moreover, when using a wire-based alignment, it may be difficult to determine the correspondence along the tangential direction of the wire if only the information of the wire locations is used for registration, and it may also be difficult to accurately locate the wire across multiple images.

Stent-based elastic registration may include several substeps which are mentioned here but explained in greater detail below. For example, a set of measurement points may be defined within the stent image (Step S25.1). Local image contexts may then be defined around each measurement point (Step S25.2). A non-rigid deformation field and similarity measures between local image contexts may then be defined (Step S25.3). The non-rigid deformation field may then be optimized (Step S25.4).

Exemplary embodiments of the present invention may accordingly perform non-rigid registration on the stent images themselves. Thus, because non-rigid registration may include the determination of deformation fields that align the stent imagery, exemplary embodiments of the present invention may determine the non-rigid deformation fields with respect to the stent imagery and not the guidewire or balloon makers.

Performing non-rigid registration may include calculating a deformation field used to align the test image $I_t(x)$ with the reference image $I_R(x)$ (Step S25.3). In defining the deformation field, the tensor product cubic B-spline may be used to represent a free-form deformation. Control points for the B-spline may be defined on a regular control lattice as $\{C_{i,j}: (i,j)=(0,0), \ldots (n_x,n_y)\}$. The values of the control points $C_{i,j}$ may be defined in terms of parameters $\phi_{i,j}=[\phi_{i,j}^x,\phi_{i,j}^y]^T$. Thus, the deformation field may be expressed in terms of a displacement vector/motion vector U as:

$$U(x;\{\phi_{i,j}\}) = \sum_{k=0}^{3}\sum_{l=0}^{3} B_k(s)B_l(t)\phi_{(\lfloor x\rfloor-1+k)(\lfloor y\rfloor-1+l)} \quad (1)$$

$$\begin{bmatrix} U^x(x;\{\phi_{i,j}\}) \\ U^y(x;\{\phi_{i,j}\}) \end{bmatrix} = \begin{bmatrix} \sum_{k=0}^{3}\sum_{l=0}^{3} B_k(s)B_l(t)\phi^x_{(\lfloor x\rfloor-1+k)(\lfloor y\rfloor-1+l)} \\ \sum_{k=0}^{3}\sum_{l=0}^{3} B_k(s)B_l(t)\phi^y_{(\lfloor x\rfloor-1+k)(\lfloor y\rfloor-1+l)} \end{bmatrix}$$

$$(x=[x,y]^T; U(x;\{\phi_{i,j}\}) = [U^x(x;\{\phi_{i,j}\}), U^y(x;\{\phi_{i,j}\})]^T$$

where $s=x-\lfloor x\rfloor$ and $t=y-\lfloor y\rfloor$. $B_k$ and $B_l$ are uniform cubic B-spline basis functions defined as follows:

$$B_0(t)=(1-t)^3/6$$

$$B_1(t)=(3t^3-6t^2+4)/6$$

$$B_2(t)=(-3t^3+3t^2+3t+1)/6$$

$$B_3(t)=t^3+6 (0\le t<1)$$

The problem of finding the deformation field may then reduce to solving for the control points $\{\theta_{i,j}\}$.

Figure 5:
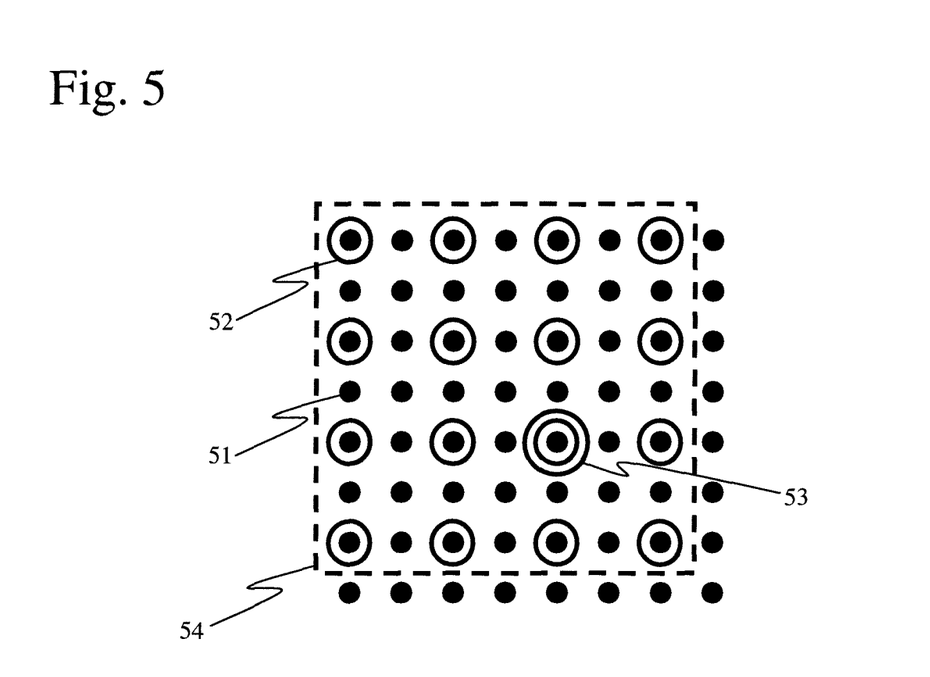
FIG. 5 is a diagram illustrating the definition of the deformation field according to an exemplary embodiment of the present invention.

FIG. 5 is a diagram illustrating the definition of the deformation field according to an exemplary embodiment of the present invention. The solid dots 51 represent the image pixels. Equation (1) provided above defines the deformation field in terms of a group of 16 control points. The control points are illustrated as the open circles 52. The proximity point set for a particular control point 53 is defined by the image pixels inside the hatched box 54.

Stent-based elastic registration may then be determined by solving for the parameters $\phi_{i,j}$ within Equation (1).

Figure 6:
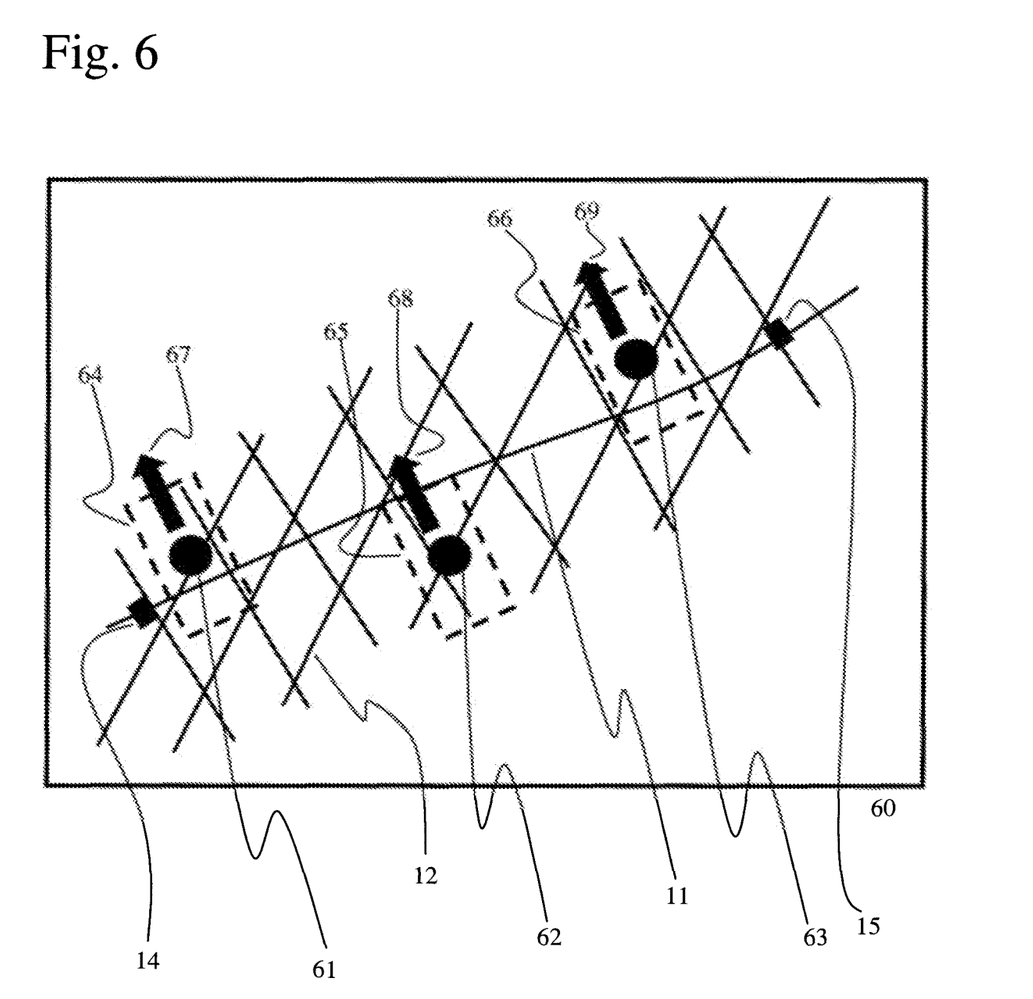
FIG. 6 is a diagram illustrating stent-based registration according to exemplary embodiments of the present invention.

Exemplary embodiments of the present invention may use local image information around the stent to derive the deformation field that best relates multiple image signals in the stent area. Such an approach may be referred to herein as a stent-based registration method. FIG. 6 is a diagram illustrating stent-based registration according to exemplary embodiments of the present invention. For each image frame that stent-based registration is to be performed on, the approximate area of the stent image may be uniformly sampled to obtain a set of measurement points.

As stent-based elastic registration seeks to align the test image $I_t(x)$ to the reference image $I_R(x)$, the set of measurement points $\{p_m=[x_m,y_m]\}_{m=1}^M$ may be determined by uniformly sampling the stent test image (Step S25.1). With the underlying deformation field defined in Equation (1), the set of correspondence measurement points in the test image may be expressed as $\{p_m+U(p_m;\{\phi_{i,j}\})\}_{m=1}^M$. For each measurement point $p_m$, the local image context $LC_R(p_m)$ may be defined as a local image region which is centered at the measurement point and oriented approximately to the direction of stent expansion (Step S25.2). Similarly, the local image context $LC_t(p_m+U(p_m))$ may be defined for the correspondence point $p_m+U(p_m)$. A similarity function may be defined with the normalized cross correlation (NCC) between the local image contexts of the measurement points:

$$f(\{\phi_{i,j}\}) = \sum_{m=1}^{M} f_{NCC}(U(p_m, \{\phi_{i,j}\})) \quad (2)$$

$$f_{NCC}(\{\phi_{i,j}\}) = NCC(LC_R(p_m), LC_t(p_m + U(p_m; \{\phi_{i,j}\})))$$

$$= \frac{Cov(LC_R(p_m), LC_t(p_m + U(p_m; \{\phi_{i,j}\})))}{\sqrt{Var(LC_R(p_m)) \cdot Var(LC_t(p_m + U(p_m; \{\phi_{i,j}\})))}}$$

where:

$$Cov(LC_R(p_m), LC_t(p_m + U(p_m; \{\phi_{i,j}\}))) =$$
$$\sum_{x \in LC_R(p_m)} I_R(x) I_t(x + U(p_m; \{\phi_{i,j}\})) / |LC_R(p_m)| -$$
$$\left( \sum_{x \in LC_R(p_m)} I_R(x)/|LC_R(p_m)| \right) \cdot$$
$$\left( \sum_{x \in LC_R(p_m)} I_t(x + U(p_m; \{\phi_{i,j}\}))/|LC_R(p_m)| \right)$$

$$Var(LC_R(p_m)) = \sum_{x \in LC_R(p_m)} (I_R(x))^2/|LC_R(p_m)| -$$
$$\left( \sum_{x \in LC_R(p_m)} I_R(x)/|LC_R(p_m)| \right)^2$$

$$Var(LC_t(p_m + U(p_m + \{\phi_{i,j}\}))) =$$
$$\sum_{x \in LC_R(p_m)} (I_t(x + U(p_m; \{\phi_{i,j}\})))^2/|LC_R(p_m)| -$$
$$\left( \sum_{x \in LC_R(p_m)} I_t(x + U(p_m; \{\phi_{i,j}\}))/|LC_R(p_m)| \right)^2$$

$$U(p_m; \{\phi_{i,j}\}) = \begin{bmatrix} \sum_{k=0}^{3} \sum_{l=0}^{3} B_k(s) B_l(t) \phi^x_{(\lfloor x_m \rfloor -1+k)(\lfloor y_m \rfloor -1+l)} \\ \sum_{k=0}^{3} \sum_{l=0}^{3} B_k(s) B_l(t) \phi^y_{(\lfloor x_m \rfloor -1+k)(\lfloor y_m \rfloor -1+l)} \end{bmatrix}$$

The local image context may cover the local profile of different sections of the stent. The stent boundary as well as the stent strut may provide image information that may be used to determine the similarity measure and the stent deformation. The optimal deformation function that maximizes the similarities between the local image contexts of the measurement points may then be used to align the two stent images (Step S25.4).

To derive the optimal deformation function, the parameter set $\{\phi_{i,j}\}$ may be optimized by maximizing the similarity function $f(\{\phi_{i,j}\})$. Gradient based methods may then be used to solve the optimization problem. The gradient vector of the similarity function may be derived as follows:

$$\nabla_{\phi_{i,j}} f(\{\phi_{i,j}\}) = \sum_{m=1}^{M} \nabla_{\phi_{i,j}} f_{NCC}(U(p_m; \{\phi_{i,j}\})) \quad (3)$$

$$\frac{\partial}{\partial \phi^x_{i,j}} f_{NCC}(U(p_m; \{\phi_{i,j}\})) =$$
$$\frac{\partial}{\partial U^x} f_{NCC}([U^x, U^y]^T) \cdot \frac{d}{d\phi^x_{i,j}} U^x(p_m; \{\phi_{i,j}\})$$

$$\frac{\partial}{\partial \phi^y_{i,j}} f_{NCC}(U(p_m; \{\phi_{i,j}\})) =$$

-continued $$\frac{\partial}{\partial U^y} f_{NCC}([U^x, U^y]^T) \cdot \frac{d}{d\phi^y_{i,j}} U^y(p_m; \{\phi_{i,j}\})$$

From the bicubic B-spline representation of Equation (1), a set of proximity points $P_{i,j}$ may be defined for a control point $C_{i,j}$, for example, as may be seen in FIG. 5. The control points may include points in the 4×4 neighborhood that have influence on $\phi_{i,j}$:

$$P_{i,j} = \{p_m = (x_m, y_m) : i-2 \leq x_m < i+2, j-2 \leq y_m < j+2\} \quad (4)$$

Since non-proximity points do not influence the gradient calculation, the following may be established:

$$\nabla_{\phi_{i,j}} f(\{\phi_{i,j}\}) = \sum_{p_m \in P_{i,j}} \nabla_{\phi_{i,j}} f_{NCC}(U(p_m; \{\phi_{i,j}\})) \quad (5)$$

In FIG. 6, there is a first measurement point 66, a second measurement point 62, and a third measurement point 63. By uniformly sampling the approximate image of the stent 12, the measurement points may be uniformly distributed throughout the area of the stent image 12. FIG. 6 shows only three measurement points 61, 62, and 62 to provide a simple example; however, it should be understood that more measurement points may be used. For example, there may be on the order of tens or hundreds of measurement points used, depending upon the approximate size of the stent area and a desired level of complexity/accuracy. It should also be understood that the stent image 12 may be considerably more faint than shown in the figures and the contrast of the stent image 12 has been exaggerated for clarity.

Around each measurement point, a local image context may be defined. For example, a first local image context 64 is shown around the first measurement point 61, a second local image context 65 is shown around the second measurement point 62, and a third measurement point 66 is shown around the third measurement point 63. The local image context may be a local image region which is centered at the measurement point. The local image context may be approximately oriented in the direction of stent expansion, for example, tangentially to the long axis of the stent image. In FIG. 6, arrows 67, 68, and 69 illustrate the direction of orientation for the corresponding local image contexts 64, 65, and 66. Additionally, a similarity function may be defined with the normalized cross correlation (NCC) between the local image contexts of the measurement points.

The local image context may cover the local profile of different sections of the stent image. The stent boundary as well as the stent strut may provide important image information for determining the similarity measure and the stent deformation. The optimal deformation function that maximizes the similarities between the local image context of the measurement points may be used to align the stent images. Alignment of the stent images may be performed using a reference image and a test image. The reference image may be an image selected to be the frame of reference. The reference image may also be the average of multiple rigidly aligned test images. The test image is the image that is to be transformed into the frame of reference of the reference image. By transforming each image frame with the same reference image, the set of image frames may be aligned.

Exemplary embodiments of the present invention may utilize a concept of hierarchical motion correction in two ways to help estimate the stent deformation. First, the stent motion estimation may be achieved by a hierarchy of rigid motion estimation followed by elastic motion estimation. For example, the rigid motion may be calculated from the locations of two balloon markers near the proximal and distal ends of the stent. In the case of stent placement without balloon markers, the rigid motion may be obtained by the approximate rigid alignment of the delivering guidewire. Initialized by the rigid motion, elastic motion estimation may use the local context information of stent images to compute the deformable stent motion. Second, the single level B-spline algorithm can be extended to a multilevel B-spline algorithm, where a hierarchy of control lattices $\Phi_0, \Phi_1, \ldots, \Phi_h$ is used and the spacing between control points is reduced from one lattice to the next. The multilevel B-spline algorithm may begin with estimating a smooth version of the deformation function and propagates through finer levels to achieve a close estimation of the deformation function.

After the image frames have been aligned by performing stent-based registration (Step S25), temporal integration may be performed (Step S26). As discussed above, temporal integration may include averaging the stent image for each aligned image frame. The integrated image may be a more easily visible representation of what the stent looks like. The integrated image may then be superimposed back onto each original (undefended) image frame so that each image frame may be displayed with a more visible representation of the stent image. Additionally, other post-processing steps may be performed. For example, the removed static background may be added back to each image frame. The final set of images may then be displayed in sequence. This post processing and display (Step S27) may be performed for the benefit of a medical practitioner who is engaged in the placement of the stent.

The above-described procedure may be repeated to provide a continuous display of image frames with enhanced stent visibility for as long as the intervention is being performed.

Exemplary embodiments of the present invention may be performed differently than the manner disclosed above. For example, stent-based registration may be performed using multilevel B-spline, speed optimization on the computation of local context-based similarity functions. The delivering guidewire may also be used instead of balloon markers to initialize the elastic registration to deal with cases with severe stent deformation.

Moreover, registration of the stent may be performed without the aid of the balloon markers or the guidewire. For example, a user may be prompted to select a portion of a displayed image that includes the stent. Hierarchical registration may then be performed using the image information from the region of interest derived from the user selection. Additionally, stent images may be aligned in rotational x-ray angiography for 3D stent reconstruction.

Figure 7:
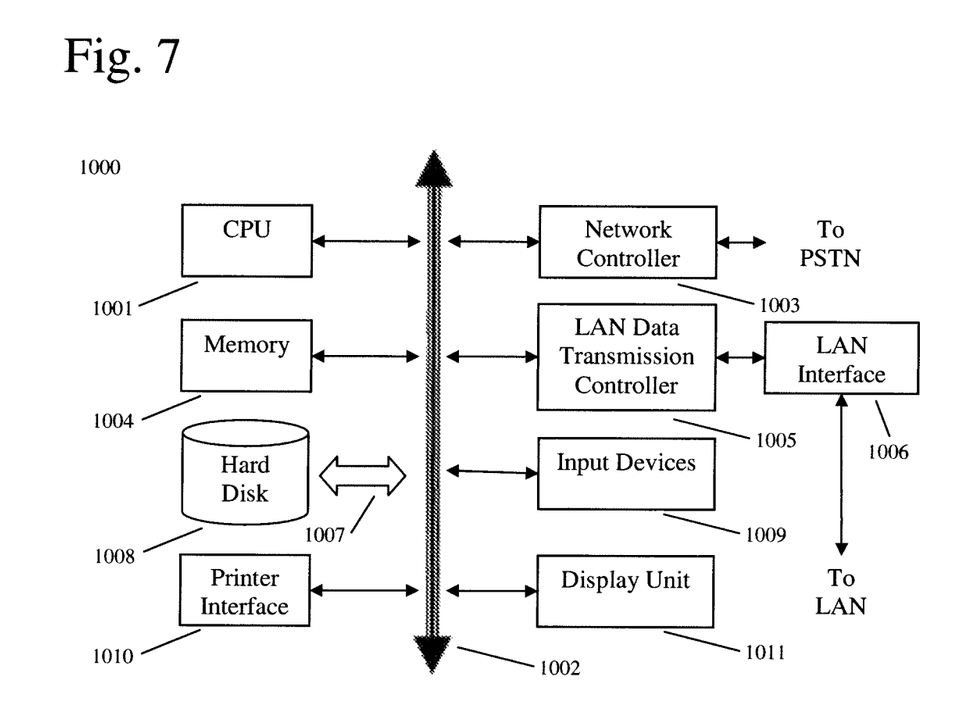
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for enhancing stent visibility in a set of image frames, comprising:
    acquiring a set of image frames including multiple test frames;
    defining a set of measurement points uniformly distributed within an image of a stent in each of the multiple test frames;
    defining a local image context around each measurement point of each of the multiple test frames;
    calculating a non-rigid deformation field that relates the local image contexts of each of the multiple test frames to local image contexts of a reference image;
    optimizing the non-rigid deformation field by maximizing a similarity function between the local image contexts of each of the multiple test frames and the local image contexts of the reference image;
    using the optimized non-rigid deformation field to deform images of a stent in each of the multiple test frames and combine the non-rigidly deformed images of the stent from each of the multiple test frames; and
    displaying an image frame of the set of image frames with the combined image of the stents superimposed thereon.

2. The method of claim 1, wherein prior to calculating the non-rigid deformation field, the test frame is preliminarily aligned to a reference frame of the set of image frames based on markers visible within the test frame and the reference frame.

3. The method of claim 2, wherein the reference frame is one of the multiple test frames.

4. The method of claim 2, wherein the preliminary alignment is a rigid or affine alignment.

5. The method of claim 2, wherein the markers include balloon markers.

6. The method of claim 1, wherein prior to calculating the rigid deformation field, preprocessing is performed on the set of image frames.

7. The method of claim 1, wherein preprocessing includes removing a static background from the set of image frames.

8. The method of claim 1, wherein the reference image is defined as a test frame of the multiple test frames or an average of multiple rigidly aligned test frames of the multiple test frames.

9. The method of claim 1, wherein after combining the stent image and prior to displaying the image frame, post processing is performed on the image frame with the combined image of the stents superimposed thereon.

10. The method of claim 9, wherein post processing includes adding back a static background that had been removed from the set of image frames.

11. The method of claim 1, wherein the set of image frames is acquired using a fluoroscope.

12. The method of claim 1, wherein the displayed image frame with the combined image of the stents superimposed thereon is used to aid in assessment of stent deployment to a desired location.

13. The method of claim 12, wherein the desired location is a coronary artery stenosis.

14. The method of claim 1, wherein the local image contexts of the test frame are oriented approximately in the direction of stent expansion.

15. The method of claim 14, wherein the direction of stent expansion is tangential to the long axis of the stent image.

16. A method for enhancing stent visibility in a set of image frames, comprising:
    acquiring a set of image frames including a test frame and a reference frame;
    detecting balloon markers within the test frame and the reference frame;
    removing a static background from the test frame and the reference frame;
    performing rigid image alignment of the test frame to the reference frame using the detected balloon markers;
    performing non-rigid registration of the test frame to the reference frame based on local image contexts of stent imagery within the test frame and the reference frame; and
    performing temporal integration of the stent imagery using the non-rigid registration.

17. The method of claim 16, further including displaying the temporal integration.

18. The method of claim 17, wherein the removed static background is reintroduced prior to displaying the temporal integration.

19. The method of claim 16, wherein the local image contexts are defined uniformly within the stent imagery.

20. A computer system comprising:
    a processor; and
    a non-transitory, tangible, program storage medium, readable by the computer system, embodying a program of instructions executable by the processor to perform method steps for enhancing stent visibility in a set of image frames, the method comprising:
    acquiring a set of image frames including a test frame and a reference frame;
    preprocessing the test frame and the reference frame;
    performing non-rigid registration of the test frame to the reference frame based on local image contexts of stent imagery within the test frame and the reference frame; and
    performing temporal integration of the stent imagery using the non-rigid registration.

21. The computer system of claim 20, wherein rigid or affine image alignment of the test frame to the reference frame is performed prior to using the detected balloon markers.

22. The computer system of claim 21, wherein the rigid or affine image alignment is performed based on balloon marker images or guidewire images.

* * * * *